UNITED STATES PATENT OFFICE.

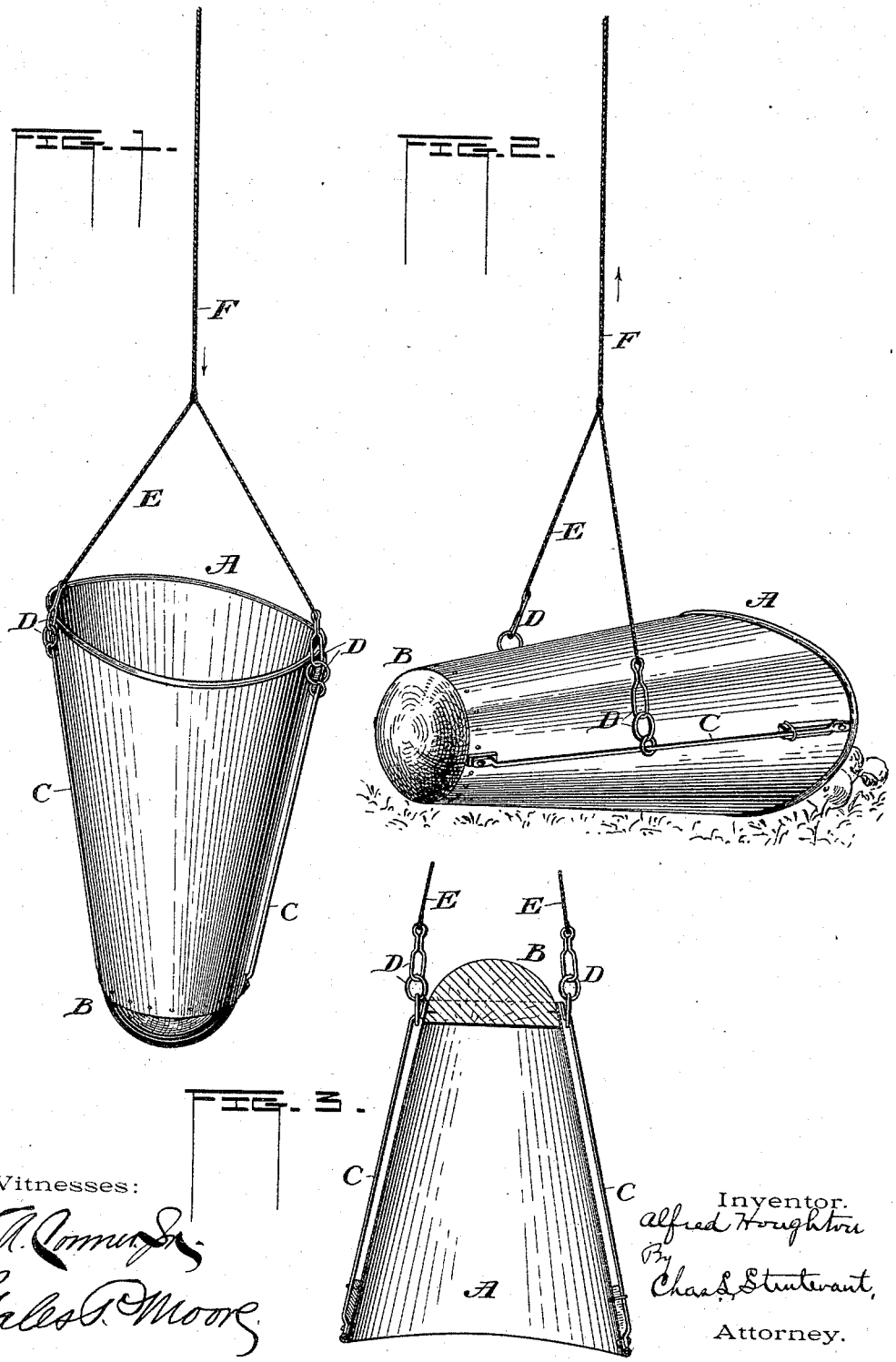

ALFRED HOUGHTON, OF SEVILLE, OHIO, ASSIGNOR OF ONE-HALF TO JOHN DE WITT, OF SAME PLACE.

FRUIT-GATHERER.

SPECIFICATION forming part of Letters Patent No. 526,574, dated September 25, 1894.

Application filed January 5, 1894. Serial No. 495,818. (No model.)

*To all whom it may concern:*

Be it known that I, ALFRED HOUGHTON, a citizen of the United States, residing at Seville, in the county of Medina, State of Ohio, have invented certain new and useful Improvements in Fruit-Gatherers, of which the following is a description, reference being had to the accompanying drawings, and to the letters of reference marked thereon.

My invention relates to harvesting implements, and more particularly to devices for gathering fruit, my object being to provide a construction by the use of which fruit may be easily and speedily gathered without danger of bruising, and to this end my invention consists in the various matters hereinafter described and claimed.

In the accompanying drawings which illustrate my invention Figure 1 is a perspective view of the gatherer in position to be filled. Fig. 2 is a perspective view of the gatherer just before being emptied; and Fig. 3 is a sectional elevation.

Referring to the drawings, A represents a chamber open at one end and at the other closed by a tapering surface B. Of course, this chamber may be cylindrical or of other suitable shape, and the tapering end may be wedge shaped, pyramidal, hemispherical, or otherwise, or the entire chamber and end may be formed from one piece and be nothing more than a tapering body, as a cone or pyramid, the object being to provide a receiving chamber with a base so constructed that when it is set thereon, it will be in unstable equilibrium. I prefer, however, to make the chamber in the shape of a flattened truncated cone, within the smaller end of which is fastened a wooden hemisphere, wood being used because of the facility with which the chamber may be attached thereto, as by means of tacks or screws.

Along the distended sides of the flattened chamber are secured guides C upon which slide links D to which is attached a bail E engaged by a cord F, by means of which the gatherer is raised and lowered.

In operation, the gatherer is carried up into the tree with the party intending to pick the fruit, and is there filled. By means of the cord or chain F it is then lowered, its tapering shape presenting no angles to engage with the limbs, but causing it to push aside the leaves and branches, and, when the gatherer has reached the ground, its tapering end tends to cause it to seek the position shown in Fig. 2, the operator regulating its fall to one side or the other by means of the cord. The gatherer having been permitted to fall upon its side, its conical form will cause the guides C to lie in an inclined plane, the lower end of which is toward the smaller end of the gatherer, and thus a slight slackening of the cord will allow the links D to slide to the lower end of the gatherer. By now drawing up the cord, the chamber is emptied without the slighest danger of bruising the fruit, and further drawing of the cord will bring the gatherer to the picker, its small end being in advance readily brushing aside the twigs and leaves in its path, just as in its downward movement.

Many changes in the guides, links, mode of attaching the hemispherical end, and other minor details will readily suggest themselves, but the principal feature of the present invention consists in providing a fruit gatherer with a base so constructed that when the device is rested thereon, it will be in unstable equilibrium.

Having thus described my invention, what I claim as new, and desire to secure by Letters Patent, is—

1. A fruit gatherer comprising a chamber for the reception of the fruit, said chamber being in the shape of a flattened truncated cone, a tapering base formed thereon and means for raising and lowering said gatherer; substantially as described.

2. A fruit gatherer comprising an upper portion for the reception of the fruit, a tapering base, and means for lowering and raising the gatherer permanently attached thereto and alternately engaging the upper and lower portions thereof; substantially as described.

3. A fruit gatherer comprising a chamber for the reception of the fruit, a tapering base formed thereon, and means for raising and lowering the gatherer movable along said chamber; substantially as described.

4. A fruit gatherer comprising a tapering chamber for the reception of the fruit, and means for raising and lowering the gatherer movable along said chamber; substantially as described.

5. A fruit gatherer comprising a chamber, guides along the sides of said chamber and a raising and lowering cord provided with a bail movable along said guides; substantially as described.

6. A fruit gatherer comprising a chamber for the reception of the fruit, said chamber being in the shape of a flattened truncated cone, a hemispherical base formed upon said chamber, guides along the distended sides of the chamber, and a bail sliding upon said guides whereby the gatherer may be raised and lowered; substantially as described.

In testimony whereof I affix my signature in presence of two witnesses.

ALFRED HOUGHTON.

Witnesses:
F. H. BEACH,
GRACE BEACH.